United States Patent

[11] 3,577,631

[72] Inventors Ernest G. Bylander; Hall E. Jarman, Dallas, Tex.

[21] Appl. No. 638,915
[22] Filed May 16, 1967
[45] Patented May 4, 1971
[73] Assignee Texas Instrument Incorporated Dallas, Tex.

[54] PROCESS FOR FABRATING INFRARED DETECTOR ARRAYS AND RESULTING ARTICLE OF MANUFACTURE
22 Claims, 22 Drawing Figs.

[52] U.S. Cl. .......... 29/572, 29/577, 317/235, 156/578, 156/17
[51] Int. Cl. .......... B01j 17/00, H01c 7/08
[50] Field of Search .......... 29/572, 620, 472.7, 501—503, 504; 317/235

[56] References Cited

UNITED STATES PATENTS

| | | | |
|---|---|---|---|
| 3,020,412 | 2/1962 | Byczkowski | 24/572 |
| 3,140,379 | 7/1964 | Schleich et al. | 29/620 |
| 3,151,379 | 10/1964 | Escoffery | 29/572 |
| 3,200,490 | 8/1965 | Clymer | 29/472.7 |
| 3,316,628 | 5/1967 | Lang | 29/472.7 |
| 3,369,290 | 2/1968 | Mayer et al. | 29/472.7 |

*Primary Examiner*—John F. Campbell
*Assistant Examiner*—W. Tupman
*Attorneys*—Samuel M. Mims, Jr., James O. Dixon, Andrew M. Hassell, Harold Levine, Rene E. Grossman, John E. Vandigriff, Richards, Harris & Hubbard, V. Bryan Medlock, Jr. and Harold E. Meier

ABSTRACT: An infrared detector array is fabricated by alloying a slice of mercury doped germanium to a degenerate germanium substrate. After being lapped to the desired thickness, the slice is etched through to the substrate to form individual detector bars using a metal mask which is then partially removed to form a gold contact strip on each bar. Output conductors are formed by patterning copper films thermocompression bonded to high temperature plastics, gold plating the conductors, and connecting the gold plated conductors to the gold contact strips by gold jumper wires thermocompression bonded to the conductors and to the contact strips.

INVENTORS

ERNEST G. BYLANDER
HALL E. JARMAN

E. Mickey Hubbard
ATTORNEY

INVENTORS
ERNEST G. BYLANDER
HALL E. JARMAN

E. Mickey Hubbard
ATTORNEY

INVENTORS

ERNEST G. BYLANDER
HALL E. JARMAN

E. Mickey Hubbard
ATTORNEY

INVENTORS
ERNEST G. BYLANDER
HALL E. JARMAN
E. Mickey Hubbard
ATTORNEY

PROCESS FOR FABRATING INFRARED DETECTOR ARRAYS AND RESULTING ARTICLE OF MANUFACTURE

This invention relates generally to infrared detectors, and more particularly relates to infrared detector arrays having a large number of very small detectors.

Infrared detector systems are presently being fabricated for use in the 8—14 micron region which employ up to 100 mercury doped germanium detector elements mounted in a linear array. Each element has a generally square cross section on the order of from 0.010 to 0.030 inch on a side, and is normally fabricated by separating a wafer into separate bars, then mounting each bar on a substrate. This procedure results in a practical limit to the minimum size bar which can be fabricated, primarily because of the problems inherent in handling very small elements. Further, the expense of an array fabricated in this manner is almost directly related to the number of elements in the system, making systems having a large number of arrays very expensive.

Advanced infrared systems require very large numbers of detectors, typically one thousand in order to meet operational requirements. Since most of these systems are airborne, the individual detector elements must be very small in order to reduce the overall system dimensions and weight. The detector elements should be as small as possible within the limits imposed by resolution requirements.

This invention is concerned with a process for fabricating an array of a large number of infrared detectors wherein each detector may be substantially as small as desired, for example, having a square cross section 0.002 inch on a side. A subarray, typically having two hundred detector elements, is fabricated by a process which lends itself to mass production, thus greatly reducing the cost of a system having a large number of detector elements.

In accordance with this invention, the infrared detector array is fabricated by alloying a slice of semiconductor detector material to a substrate, then chemically etching selected areas of the slice to divide the slice into a plurality of separate detector elements. In a preferred embodiment, the substrate is a degenerate form of the same semiconductor material used for the detectors which provides a process carrier for the slice that has a matched thermal coefficient of expansion for stress relief during temperature cycling as well as high electrical and thermal conductivity. More particularly, the detector material is mercury doped germanium and the substrate is gallium or arsenic doped germanium.

In accordance with a specific aspect of the invention, the slice of detector material is etched into bars using a metal mask having etching slots substantially narrower than the ultimate width of the etched groove. As the detector material is etched through the slots, the edges of the metal mask overhanging the etch groove is repeatedly bent down over the side walls of the groove to slow the etch rate of the side walls and achieve a relatively high depth to width etch ratio. The resulting detector bars have a substantially square cross section and are separated by grooves of about the same width.

In accordance with another aspect of the invention, multiple metal layers are used to form the etch mask to provide a metal contact strip on each detector bar and to improve adhesion of the contact strip to the metal bar.

The invention also contemplates a process for electrically connecting the very small individual contact strips to larger solder pads for easy connection to outside circuitry by patterning a copper film thermocompression bonded to a thin flexible sheet of high temperature plastic, gold plating the patterned copper film, and then interconnecting the metal contact strips on the individual bars and the conductors either by gold jumper wires or by direct thermocompression bonds between the contact strips and the conductors.

In accordance with still another aspect of the invention, two arrays are juxtaposed in staggered relationship to effectively provide a continuous line of elements for incorporation in a scanning system.

Various aspects of the array produced by the process are also claimed.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
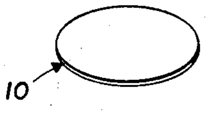
FIG. 1 is a perspective view of a slice of infrared detector material used to fabricate a detector array in accordance with the present invention.
Figure 2:
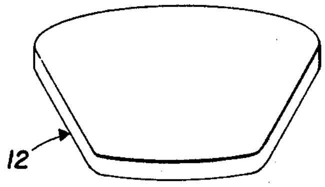
FIG. 2 is a perspective view of the substrate used to fabricate the detector array in accordance with the present invention.
Figures 3, 4, 5:
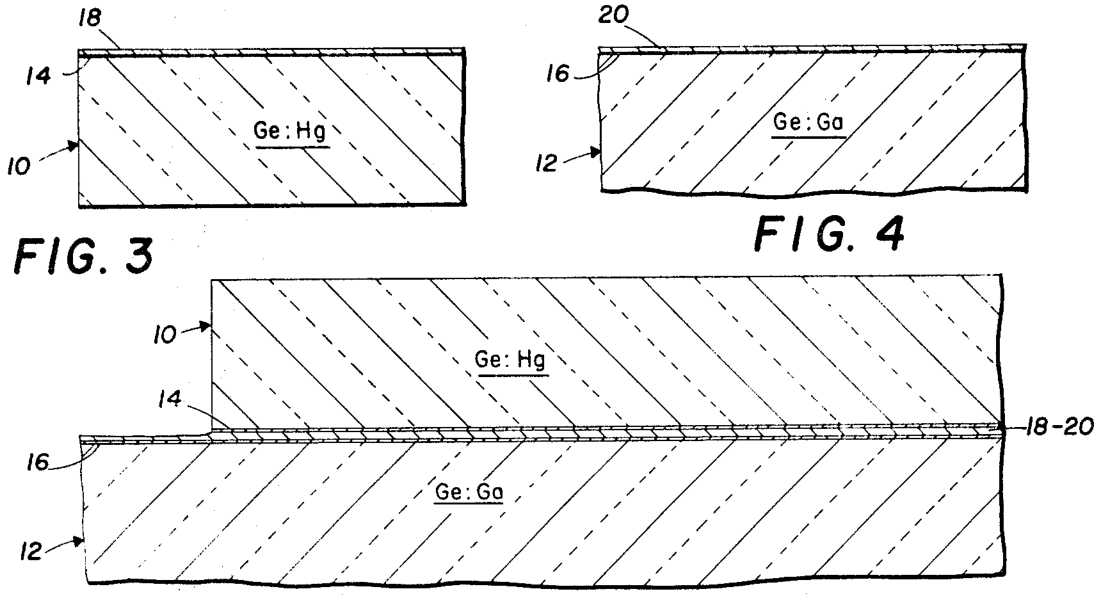
Figures 18, 19, 20, 21:
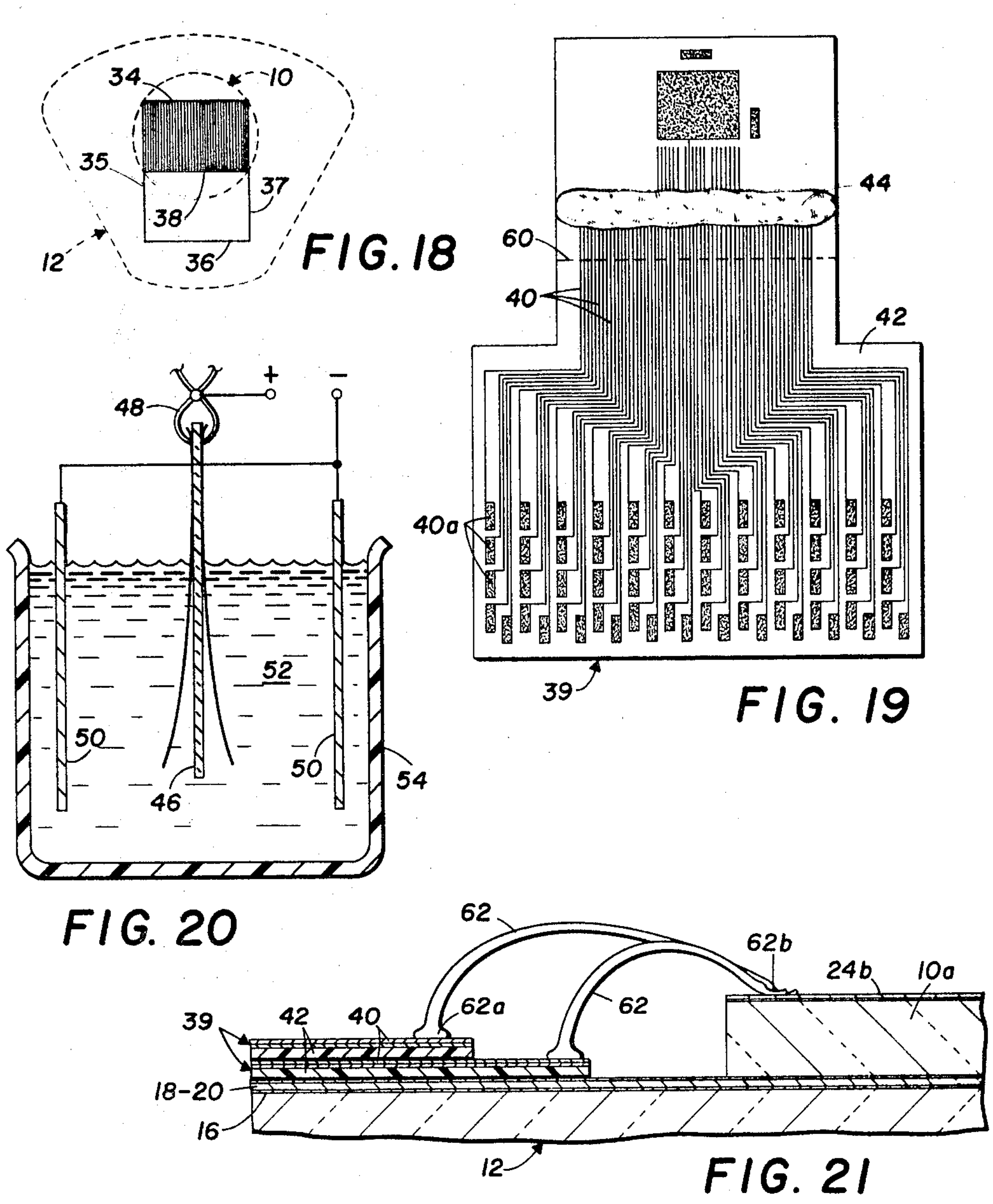
Figure 22:
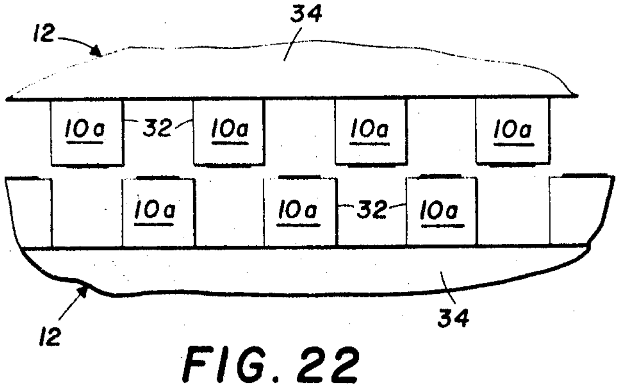

FIGS. 3—5 are somewhat schematic sectional views illustrating the manner in which the slice of FIG. 1 is alloyed to the substrate of FIG. 2;

FIGS. 6—17 are somewhat schematic sectional views illustrating the manner in which the slice of detector material is masked and etched in accordance with the present invention;

FIG. 18 is a somewhat schematic top view illustrating the manner in which the substrate is cut in order to produce the array in accordance with the present invention;

FIG. 19 is a plan view of the lead pattern for a detector array in accordance with this invention;

FIG. 20 is a schematic diagram illustrating the gold plating apparatus for the lead pattern of FIG. 19;

FIG. 21 is a somewhat schematic sectional view illustrating the manner in which the elements of the array are connected to the lead pattern shown in FIG. 19; and FIG. 22 is an enlarged partial end view illustrating how two or more detector arrays are used in accordance with this invention.

Referring now to the drawings, a slice of infrared semiconductor detector material is indicated generally by the reference numeral 10 in FIG. 1. The slice 10 is typically about 1 inch in diameter and about 0.010 inch thick, and is germanium doped with mercury in a manner known in the art.

A high conductivity substrate is indicated generally by the reference numeral 12 in FIG. 2. The substrate 12 is a degenerate form of the same semiconductor material as the slice 10, and is preferably germanium doped with gallium to a level such that the germanium is degenerate and has a resistance of about 0.0007 ohm-centimeter. Both the slice 10 and the substrate 12 are preferably cut along the (111) plane.

One surface of the slice 10 and one surface of the substrate 12 are mechanically-chemically lapped and polished using a Clorox-water polishing solution. After the surfaces are highly polished, the surfaces are degreased with a commercial solvent and dried in an oven. The slice 10 and substrate 12 are then placed in a vacuum evaporator and a thin layer 14 of chromium deposited on the polished surface of the slice 10, and a thin layer 16 of chromium deposited on the polished surface of the substrate 12, as illustrated in FIGS. 3 and 4. Then a thicker layer 18 of gold is vacuum deposited on the chromium layer 14 and a thicker layer 20 of gold deposited on the chromium layer 16. The depositions of the chromium layers 14 and 16 and the gold layers 18 and 20 are both carried out with the slice 10 and substrate 12 at a temperature of about 150° C. The purpose of the chromium layers 14 and 16 is to more adherently bond the gold layers 18 and 20 to the slice 10 and substrate 12, respectively. Next, the slice 10 is inverted and placed on the substrate 12 with the gold layer 18 in contact with the gold layer 20. A weight is placed on the slice 10, and the sandwich placed in an oven, and heated to about 425° C. to melt the gold, then slow cooled to about 200° C. over a period of 5 or 6 minutes to alloy the slice 10 to the substrate 12 as illustrated in FIG. 5.

If desired, the slice 10 may be alloyed to the substrate 12 by first coating the polished surfaces with gold plate from an acid plating solution for a period of about 2 minutes, then placing a thin preform comprised of about 88 percent gold and 12 percent germanium between the gold plated surfaces. The sandwich is then heated to about 360° C. while inducing a slight scrubbing action, then maintained under pressure until cooled below about 356° C. where the alloy completely solidifies.

After the slice 10 has been alloyed to the substrate 12, the exposed surface of the slice 10 is lapped and polished using a water-Clorox solution in a mechanical-chemical lapping apparatus. The mercury doped germanium is lapped at a rate of about 0.001 inch per hour, thus providing a means for closely controlling the ultimate thickness of the mercury doped germanium slice 10. The slice 10 is lapped until it has a thickness corresponding to the ultimate dimensions desired for the individual infrared detector elements. Thus, if each element is to be 0.002 inch square, for example, the slice 10 is lapped until it is 0.002 inch thick. The substrate 12 and slice 10 are then degreased and baked out in the conventional manner to remove impurities.

Figure 6:
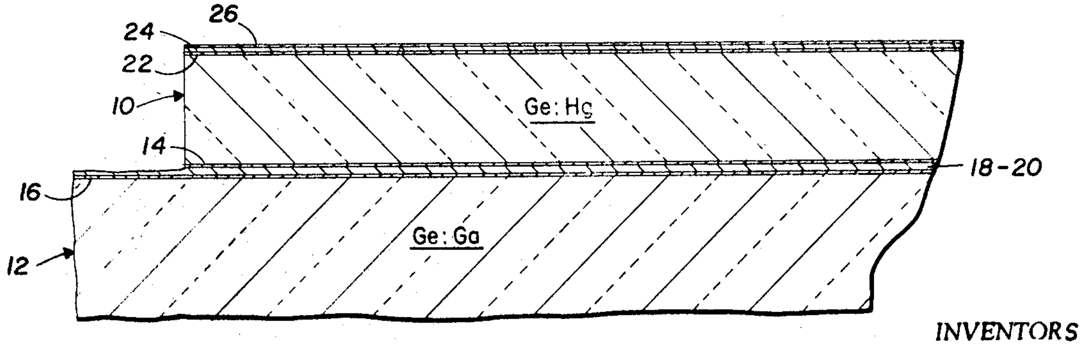

Next, the substrate 12 and slice 10 are placed in an evaporator and a thin layer 22 of chromium vacuum deposited on the polished surface of the mercury doped germanium slice 10 followed by a thicker layer 24 of gold, as illustrated in FIG. 6. These two layers are deposited with the slice 10 at about 150° C. The purpose of the chromium layer 22 is to adherently bond the gold layer 24 to the germanium slice 10. The gold layer 24 will first serve the function of an etching mask, and ultimately the function of an electrical contact. The slice 10 is then cooled to room temperature and a second relatively thin chromium layer 26 vacuum deposited on the gold layer 24. The second chromium layer 26 is deposited at room temperature because its sole purpose is to serve as an etching mask for the gold layer 24, and it will ultimately be removed as will hereafter be described.

Figure 7:
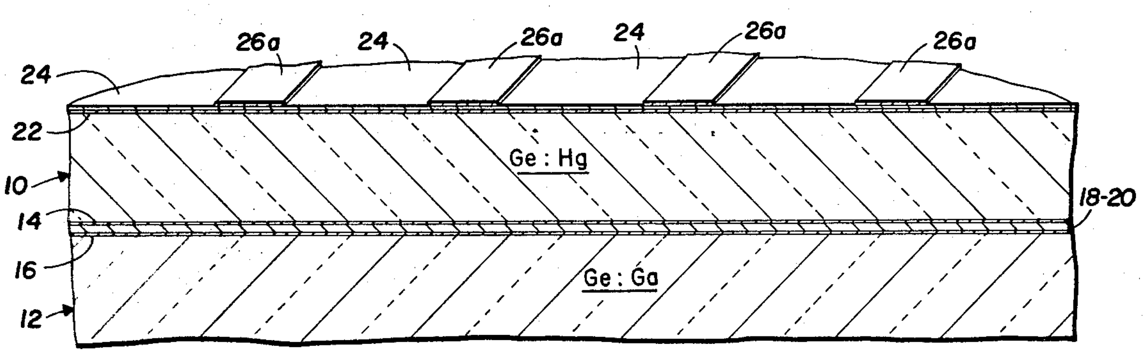

Next, the second chromium layer 26 is patterned using a conventional photolithographic technique to leave strips *26a*, as shown in FIG. 7. This is achieved by using a standard photoresist such as KMER to mask the chromium strips *26a*, and a 1:1 solution of hydrochloric acid and methyl alcohol which selectively etches the chromium in preference to the underlying gold layer 24. Zinc dust is sprinkled on the chromium to activate the etching process. Gold layer 24 protects the first chromium layer 22. If the ultimate dimension of the infrared detector elements is to be 0.002 by 0.002 inch, then the chromium strips *26a* extend in parallel relationship across the entire slice, are spaced on 0.004 centers, or the desired centers of the individual detector elements, and are about 0.0015 inch wide.

Figure 8:
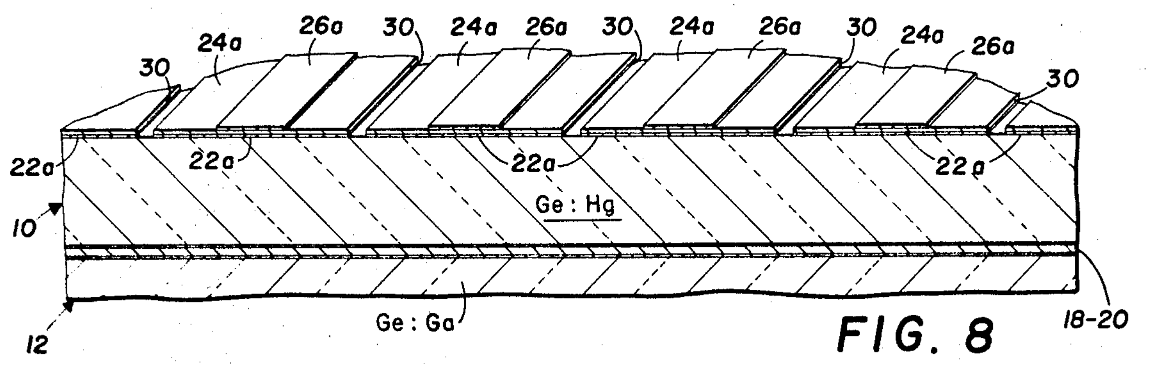

Next, the gold layer 24 and the first chromium layer 22 are selectively removed to leave gold strips *24a* and form slots 30 which expose the underlying mercury doped germanium slice 10, as shown in FIG. 8. This is achieved using a photolithographic technique in which the chromium strips *26a* and the gold layer 24 are protected by a photoresist, such as KMER, and the gold is selectively removed using a potassium, iodide and water solution having excess iodide, and the chromium removed by the hydrochloric acid and methyl alcohol solution previously mentioned. After the slots 30 are formed, the photoresist is removed.

Next, the substrate 12 is mounted on a suitable holder, such as by waxing the bottom of the substrate 12 and pressing the wax against a gold plate. The slice 10 is then disposed in inverted position in an upwardly directed geyser of a suitable etching liquid for the germanium, such as hydrofluoric acid. The etching rate of the germanium in the hydrofluoric acid is about 0.0005 inch per minute. The hydrofluoric acid is ineffectual against either the chromium strips *26a* or the gold strips *24a*, and thus etches only the portion of the germanium slice 10 exposed through slots 30.

Figure 9:
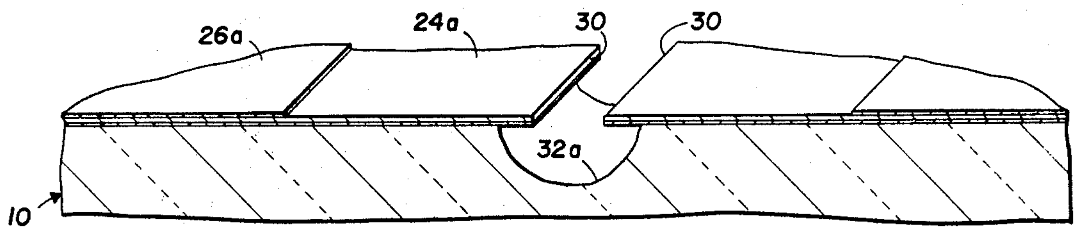
Figure 10:
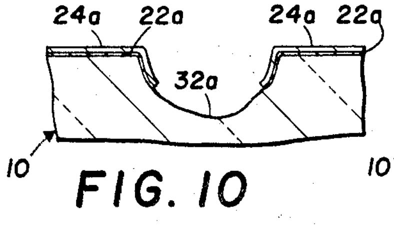
Figure 11:
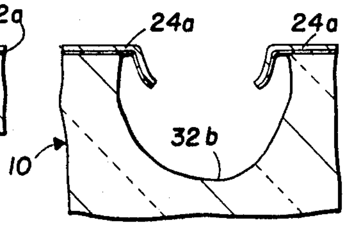
Figure 12:
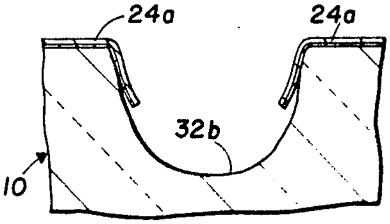
Figure 13:
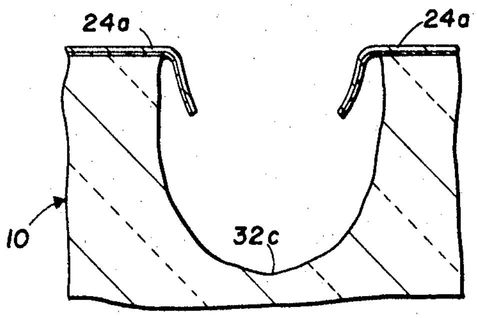
Figure 14:
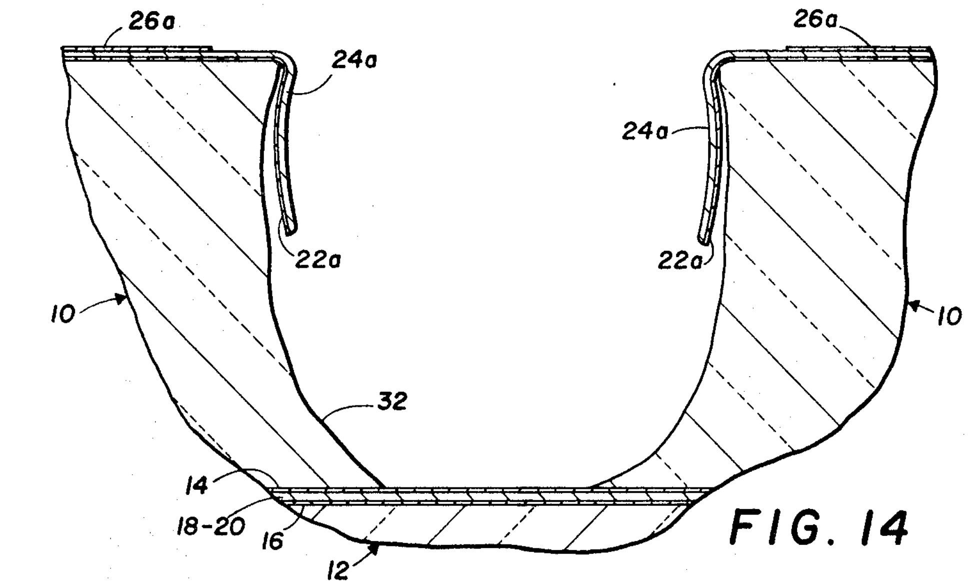
Figure 15:
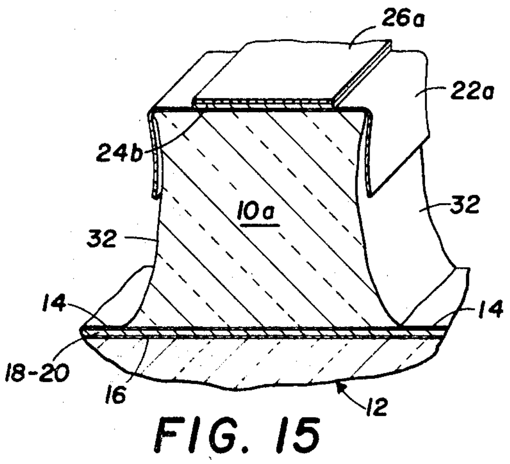

In order to assure uniform etching, the slice 10 is rotated 90° every 10 seconds. Then every 30 seconds, the slice 10 is removed from the etchant stream, held under water, and brushed along the length of the slots 30 using a soft, fine-bristled paint brush. The purpose of the brushing is to bend the portion of the gold strips *24a* and the underlying chromium layer 22 downwardly into the respective grooves *32a* etched in the germanium slice and against the walls of the grooves as shown in FIG. 10. The downturned metal layers partially mask the sides of the grooves *32a* as they are formed, and thus retard etching of the walls of the grooves while permitting unrestricted etching of the bottoms of the grooves. An attempt has been made to illustrate the effects of this procedure in FIGS. 9—15. In general, etching will occur in the lateral direction as well as in the vertical direction, undercutting the overhanging metal layers, unless restricted by the downturned metal mask. FIG. 9 is an attempt to illustrate the cross-sectional configuration of the etched grooves *32a* prior to the first brushing. During the brushing cycle of the process, the overhanging edges of the metal strips are bent downwardly against the sides of the etched groove *32a* substantially as shown in FIG. 10. During the next etching cycle, the etched groove is again deepened to form groove *32b* somewhat as shown in FIG. 11, and during the subsequent brushing the metal layers 24 and 22 are bent further downwardly along sides of the groove *32b* to further protect the sidewalls of the groove as shown in FIG. 12. This sequence is repeated, as shown in FIGS. 13 and 14, until the germanium slice 10 is etched completely through to the chromium layer 14, at which time the etched groove appears somewhat as shown in FIG. 15. The total time required for the etching fluid to etch through the germanium slice 10 is typically about 4 minutes.

Figure 16:
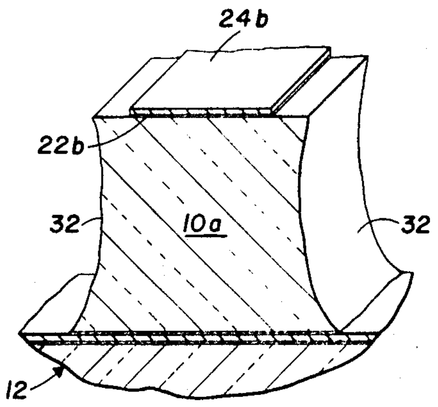
Figure 17:
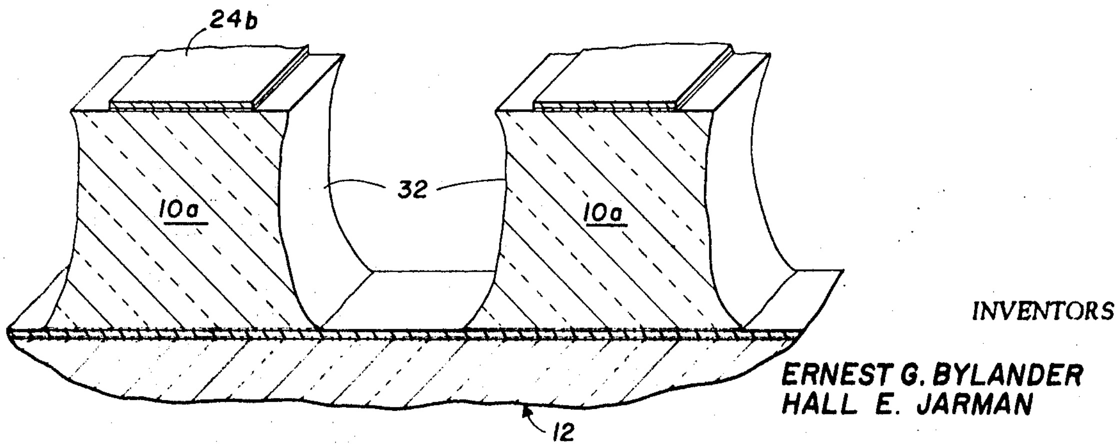

Next, the portion of the gold strip *24a* that is unprotected by the chromium strips *26a* is removed using the potassium iodide etching solution, thus leaving gold strips *24b* substantially as illustrated in FIG. 16. Then the chromium strips *26a* and the portion of the chromium layer 22 that is unprotected by the remaining gold strips *24b* are removed using the hydrochloric acid and methyl alcohol etching solution. This leaves the gold strips *24b* exposed to provide electrical contact with the individual detector bars *10a*, as illustrated in FIG. 17. The remaining portions of the chromium layer 22 underlying the gold strips *24b* enhance the mechanical bond between the gold and the detector bars *10a*.

Next, the slice 10 and substrate 12 are sawed along edges 34, 35, 36, and 37 as illustrated in FIG. 18 to remove excess material. Only the slice 10 is sawed along edge 38 to trim off the ends of the detector elements *10a*. The edge 34 is then polished using a glass lapping plate and 3600 grit silicon carbide and water in order to square the ends of the detector elements while avoiding chipping. Only the ends of the detector elements *10a* at edge 34 are ultimately exposed to the infrared radiation.

During the fabrication process, the degenerate germanium substrate 12 served as a carrier for the slice 10 and ultimately the detectors *10a*. The degenerate germanium substrate 12, together with the chromium and gold alloying layer, also provides a common electrical terminal and a very good heat sink for all of the detector elements. It will be appreciated that the gold contact strips *24b* are only about 0.0015 inch wide and that there are about three hundred elements in an array 0.6 inch wide. Thus, connecting each individual detector element *10a* into the individual amplifier circuit constitutes a substantial problem which is solved in accordance with this invention in the following manner.

Referring now to FIG. 19, a printed circuit-type sheet in accordance with this invention is indicated generally by the reference numeral 39. The circuit sheet 39 has a very thin, typically 0.0005 inch, flexible, high temperature plastic substrate 42, which is preferably the polypyromellitimide plastic commonly referred to as H-film and sold under the trademark Kapton by DuPont. The H-film is an infusible, nonflammable material with high mechanical stability, excellent electrical properties, and excellent resistance to chemicals, water and abrasion. These properties exist throughout a wide temperature range from liquid helium temperatures to over 400° C. The H-film is presently commercially available with various clad metals. The metals are either thermocompression bonded to the plastic film, or bonded to the film with a binder, such as Teflon. Only the thermocompression bonded stock has been found suitable for this process. In addition, Teflon and irradiated polyethylene film to which metal layers are thermocompression bonded may also be used since these plastics have similar properties, although H-film to which copper foil has been thermocompression bonded is preferred as the starting material for this process.

The copper foil bonded to the H-film is patterned by conventional photolithographic techniques to form a large number of conductor 40 each of which terminates at an enlarged solder pad 40*a*. Then a silver epoxy shorting bar is painted across the ends of the conductor 40 to facilitate making uniform electrical contact with all of the conductors 40. The conductors 40 are plated with gold using a plating apparatus such as illustrated schematically in FIG. 20. The sheets 39 are clamped on either side of a glass holder plate 46 using a clamp 48 which engages the silver shorting bar 44. The conductors 40 on the H-film sheets 42 form the cathodes of an electroplating system, and gold foil sheets 50 form anodes. The cathodes and anodes are immersed in an acid plating solution 52 in a polyethylene tank 54. The plating solution may be purchased under the trade name Sel-Rex Temperex HD from Sel-Rex Corporation, 75 River Road, Nutley, New Jersey. An AC potential is applied across the cathode and anode to produce a negative current flow from the anode to the cathode during one-half cycle for plating gold on the copper and a positive current during the other half cycle to repel hydrogen ions and prevent build up of hydrogen bubbles on the plating surface. The positive current is approximately 20 percent of the negative current. The thickness of gold on the copper required to achieve a thermocompression bondable layer has not been measured, but can be determined by a trial and error procedure. In general, if the gold layer is either too thin or too thick, thermocompression bonding cannot be achieved.

After the copper conductors 40 have been gold plates, a portion of the H-film sheet 42 is trimmed away along dotted line 60 to remove the silver shorting bar 44. Each of the circuit sheets 39 typically has only about one-fourth to one-sixth as many conductors as the number of elements 10*a* in an array. For this reason, from four to six circuit sheets 39 may be stacked two or three deep on the top surface of the substrate 12 with the ends disposed adjacent the edge 38 of the array of elements 10*a* by setting the ends of the upper circuit sheets 39 further back from the edge 38 than the bottom circuit sheets, substantially as shown in FIG. 21. The sheets 39 are bonded in place on the substrate 12 using GE varnish, which is then baked for about one-half hour at about 150° C. Gold jumper wires 62, typically about 0.007 inch in diameter, are then thermocompression bonded to the gold plated conductors 40 and to the gold contact strips 24*b* on the respective detector elements 10*a* using a conventional thermocompression or ball bonding apparatus. For the thermocompression bonding, the substrate 12, and hence all structures associated with the substrate, is heated to a temperature of about 200° C. The capillary feeding the gold wire is typically heated to about 300° C. The capillary feeding the gold wire 62 lowers the end of the wire, which is balled as a result of being previously severed by a flame, against the gold plated conductor 40 and presses the balled end against the conductor to form the first thermocompression bond 62*a*. Then the capillary is moved to the respective contact strip 24*b*, playing out the wire as it is moved, and the edge of the wire is pressed against the respective gold contact strip to make a second thermocompression bond 62*b*. The capillary is then raised upwardly until the wire can be cut by the flame, and the remaining pigtail is removed by tweezers in the conventional manner.

Alternatively, the conductors 40 may be sized and spaced to correspond to the gold contact strips 24*b* and the gold plated conductors 40 thermocompression bonded directly to the gold contact strips 24*b*. This is achieved by heating the substrate assembly to about 200°—225° C., inverting the sheet 39, and aligning the conductor 40 with the underlying contact strips 24*a*, and then forcing the conductors 40 against the respective contact strips by a heated mandrel to achieve a thermocompression bond. Since the plastic sheet 42 is transparent, alignment of the conductors 40 with the underlying contact strips 24*b* is easily accomplished.

The conductors of the detector array are painted with GE varnish or other insulating material. The detector elements 10*a* are painted black everywhere except at the ends at edge 34 so that the detectors will be sensitive only to infrared radiation passing in through that end. Each detector can then be connected to its respective amplifier circuit by soldering to the respective pad 40*a*.

In use, two arrays are then disposed in opposed, staggered relationship, as shown in FIG. 22, to provide a continuous line of detectors for scanning The signals from the detectors of one subarray may be electronically delayed by the period required for the scan to travel from the detectors of one subarray to the detectors of the other subarray.

The process of the present invention can also be used to fabricate arrays or mosaics of other radiating elements, either detectors or emitters, for detecting or displaying information representations. For example, an array of light emitters may be fabricated using the same process as heretofore described, except that the slice 10 would be a suitable semiconductor material, such as gallium arsenide, indium arsenide, or other group III—group V semiconductor, and a PN junction would be formed extending parallel to the surfaces of the slice prior to alloying of the slice to the substrate 12. The PN junction could be formed using any conventional technique, such as by diffusion or by an epitaxial process. In the alternative, the PN junction for the light emitter could be formed at the time the slice 10 is alloyed to the substrate 12. Thus, a lightly doped gallium arsenide slice 10 could be alloyed to the degenerate germanium substrate 12 using tin, a tin-tellurium alloy, a gold-tellurium alloy, or a gold-zinc alloy, for example. During the alloying process, the impurities would diffuse into the gallium arsenide to form a PN junction extending parallel to the surface of the slice. The slice could then be divided into elements having the desired shape and the gold contacts 24*b* patterned to provide an opening through which the light would be emitted.

An array of semiconductor lasers of a type known in the art can also be fabricated using the same process. The slice 10 would again be, for example, gallium arsenide appropriately doped with a PN junction formed in the same manner as described above, either by diffusion, epitaxy or alloying. However, in this case the opposite ends of the elongated elements, which might have the same shape as illustrated in FIG. 18, could be polished or cleaved and made precisely planar and parallel before the slice 10 is alloyed to the substrate 12. The polished ends could be protected during the etching process by a layer of gold. As in all cases, the elements would be coated with an opaque material.

Within the broader aspects of this invention, any degenerate semiconductor substrate having the requisite temperature coefficient of expansion may be used. Also, more than one type of semiconductor may be alloyed to the surface of the substrate because the coefficients of expansion of many semiconductor materials are close to the same values. This provides a means for forming an integrated circuit having components of widely diverse operating parameters available only when different types of semiconductor materials are used for the various components For example, silicon and most other III—V semiconductors can be alloyed to a degenerate germanium or other semiconductor substrate. The degenerate substrate provides a carrier for a number of different types of semiconductor materials during processing over a wide temperature range, an also provides a mounting for the materials which is a good electrical and thermal conductor.

Although preferred embodiments of the invention have been described in detail, it is to be understood that various changes, substitutions and alterations can be made therein without departing from the spirit and scope of the invention as defined by the appended claims.

We claim:

1. The process for fabricating an array of radiation elements having a plurality of very small elements which comprises:

alloying a slice of active semiconductor material to a substrate of degenerate semiconductor material, lapping the slice until it has a thickness corresponding to one dimension of the elements,
vacuum depositing a layer of gold over the slice,
vacuum depositing a layer of chromium on the layer of gold,
selectively removing the layer of chromium in preselected areas to leave chromium strips overlying the portion of the slice which will ultimately form the elements,
selectively removing the gold in relatively narrow strips between the areas where the elements are ultimately to be formed to expose the surface of the slice,
subjecting the slice to an etchant fluid directed through the slots in the gold to etch a groove in the slice while periodically bending the portions of the gold layer overhanging the grooves downwardly against the sidewalls of the grooves to partially protect the sidewalls from the etchant fluid so that the groove will have a high depth to width ratio until the grooves extend through and separate the slice into a plurality of elements,
selectively removing the gold layers unprotected by the chromium strips, and
selectively removing the chromium strips to leave the underlying gold on the individual elements to form electrical contacts for the elements.

2. The process defined in claim 1 further characterized by:
patterning a thin copper film thermocompression bonded to a thin flexible sheet of high temperature plastic to form a plurality of conductors each terminating in an expanded solder pad,
electroplating the copper conductors with gold, and
connecting each of the conductors to an electrical contact of a detector element by thermocompression bonding a gold wire to the gold plated conductor and to the gold contact on the detector element.

3. The process defined in claim 1 further characterized by:
patterning a thin copper film theremocompression bonded to a thin flexible sheet of high temperature plastic to form a plurality of conductors each terminating in an expanded solder pad,
electroplating the copper conductors with gold, and
connecting each of the conductors to a gold contact of a detector element by positioning the end of the conductor over the contact, heating the contact, and pressing the conductor against the heated contact with a heated tool applied to the other side of the high temperature plastic sheet to form a thermocompression bond between the conductor and the contact.

4. The process defined in claim 1 further characterized by:
patterning a thin copper film thermocompression bonded to a thin flexible sheet of high temperature plastic to form a plurality of conductors each terminating in an expanded solder pad,
electroplating the copper conductors with gold, and
connecting each of the conductors to a contact on an element by an aluminum wire ultrasonically bonded to the conductor and to the contact.

5. The process for fabricating an array of very small, closely spaced semiconductor elements which comprises:
bonding a thin slice of semiconductor material to a semiconductor substrate;
forming a malleable etching mask on the surface of the slice having narrow slots therein, thereby exposing portions of the surface of the semiconductor material;
subjecting the exposed portions of the surface to an etching fluid directed through the slots for a time sufficient to etch cavities through the semiconductor slice but not through the substrate, thereby forming a plurality of individual semiconductor elements;
concurrently with the etching of said cavities, periodically bending the edges of the mask left overhanging the cavities along the sides of the undercut area, thereby partially protecting the sidewalls of the cavities from contact by the etching fluid; and
electrically connecting the individual elements to form an electrically operational array.

6. The process defined in claim 5 wherein the substrate is comprises of a degenerate semiconductor material.

7. The process defined in claim 5 wherein the individual elements are electrically connected to form an electrically operational array by:
forming a contact on each of the individual elements;
forming a circuit sheet containing a plurality of conductors; and
electrically connecting the contact on each individual element to a designated conductor on the circuit sheet.

8. The process defined in claim 7 wherein the malleable etching mask is formed from an electrically conductive material and only a portion of said mask is removed utilizing the remaining portion as an electrically conductive contact on each element.

9. The process for fabricating an array of very small, closely spaced semiconductor elements which comprises:
bonding a thin slice of semiconductor material to a semiconductor substrate;
separating the slice into a plurality of individual elements by forming narrow grooves extending through the slice of semiconductor material, but not through the substrate;
forming a contact on each of the individual elements;
patterning a metal film bonded to a thin sheet of high temperature plastic thereby forming a circuit sheet having a plurality of conductors extending to enlarged solder pads; and
electrically connecting the contact on each element to a designated conductor on the circuit sheet, thereby forming an electrically operational array.

10. The process defined in claim 9 wherein the circuit sheet is patterned to form an array of conductive leads connecting each individual element to a separate lead extending outside of the circuit sheet.

11. The process for fabricating an array of very small, closely spaced semiconductor elements which comprises:
bonding a thin slice of semiconductor material to a semiconductor substrate;
forming narrow grooves extending through the slice of semiconductor material, but not through the substrate thereby separating the slice into a plurality of individual elements;
forming a contact on each of the individual elements;
patterning a copper layer thermocompression bonded to a thin flexible high temperature plastic sheet thereby formimg a circuit sheet having copper conductors thereon;
plating the copper conductors with a gold layer; and
electrically connecting the contact on each element to a designated conductor on the circuit sheet, thereby forming an electrically operational array.

12. The process defined in claim 11 wherein a jumper wire is thermocompression bonded to the contact on each element and to its respective conductor on the circuit sheet.

13. The process defined in claim 11 wherein the conductors on the circuit sheet are connected to the metal contacts on the individual elements by:
placing a portion of each conductor against its respective contact;
heating the contacts to a temperature of from about 150° C. to about 250° C.; and
pressing the circuit sheet against the contact by a tool heated to a temperature sufficient to establish a thermocompression bond between the contact and its respective conductor on the circuit sheet.

14. The process for fabricating an array of very small closely spaced semiconductor elements which comprises:
bonding a thin slice of semiconductor material to a semiconductor substrate;
vacuum depositing a thin layer of chromium on the surface of the slice;
vacuum depositing a relatively thick layer of gold on the chromium layer;
vacuum depositing a second chromium layer on the gold layer;

selectively removing the second chromium layer in all areas except where a gold contact is ultimately desired on the surface of the semiconductor material;

forming narrow slots in the gold layer and underlying first chromium layer, thereby exposing that portion of the surface of the semiconductor material where deep narrow grooves are to be formed, separating the slice into a plurality of individual elements;

subjecting the exposed area of the surface to an etching fluid directed through the slots, thereby forming cavities in the semiconductor material;

concurrently with the forming of said cavity, periodically bending the edges of the mask left overhanging the cavity along the sides of the undercut area, partially protecting the sidewalls from contact by the etching fluid, and thereby forming deep narrow grooves extending through the slice of semiconductor material but not through the substrate;

subjecting the slice to a selective etchant for the gold except where protected by the chromium of the second chromium layer;

then subjecting the slice to a selective etchant for the chromium to remove the second chromium layer which is not protected by the gold, the remaining gold and underlying chromium forming electrical contacts for the respective elements;

forming a circuit sheet which contains a plurality of conductors; and electrically connecting the contact on each individual element to a designated conductor on the circuit sheet.

15. The process defined in claim 14 wherein the substrate is comprised of a degenerate semiconductor material.

16. The process for fabricating a photodetector array of very small, closely spaced semiconductor detector elements which comprises:

bonding a thin slice of photosensitive semiconductor material to a degenerate semiconductor substrate;

separating the slice into a plurality of individual detector elements by forming narrow grooves extending through the slice of photosensitive semiconductive material, but not through the substrate;

forming a contact on each of the individual detector elements;

forming a circuit sheet suitable for use in a photodetector by patterning a copper layer thermocompression bonded to a thin flexible high temperature plastic sheet thereby forming an array of conductors;

plating the copper conductors with a gold layer; and electrically connecting the contact on each element to a designated conductor on the circuit sheet.

17. The process defined in claim 16 wherein a jumper wire is thermocompression bonded to the contact on each element and to its respective conductor on the circuit sheet.

18. The process defined in claim 16 wherein the conductors on the circuit sheet are connected to the metal contacts on the individual elements by:

placing a portion of each conductor against its respective contact;

heating the contacts to a temperature of from about 150° C. to about 250° C.; and pressing the circuit sheet against the contact by a tool heated to a temperature sufficient to establish a thermocompression bond between the contact and its respective conductor on the circuit sheet.

19. The process for fabricating a photodetector array of very small, closely spaced semiconductor detector elements which comprises:

alloying a thin slice of photosensitive semiconductor material to a degenerate semiconductor substrate;

forming a malleable etching mask of an electrically conductive material on the surface of the slice having narrow slots therein, thereby exposing that portion of the surface of the photosensitive semiconductor material;

subjecting the exposed portion of the surface to an etching fluid directed through the slots, thereby forming cavities in the semiconductor materials;

concurrently with the forming of said cavities, periodically bending the edges of the mask left overhanging the cavities along the sides of the undercut area, partially protecting the sidewalls from contact by the etching fluid, and thereby forming deep narrow grooves extending through the slice of semiconductor material, but not through the substrate, separating the slice into a plurality of individual detector elements;

removing only a portion of the mask to leave an electrically conductive contact on each element;

patterning a metal film bonded to a thin flexible high temperature plastic sheet to form a plurality of conductors extending to enlarged solder pads, thereby forming a circuit sheet suitable for use in a photodetector; and electrically connecting the contact on each detector element to a designated conductor on the circuit sheet.

20. The process defined in claim 19 wherein the photosensitive semiconductor material is comprised of mercury-doped germanium and the semiconductor substrate is comprised of degenerate germanium.

21. The process for fabricating a photodetector array of very small, closely spaced semiconductor elements which comprises:

alloying a thin slice of photosensitive semiconductor material to a degenerate semiconductor substrate;

vacuum depositing a thin layer of chromium on the surface of the slice;

vacuum depositing a relatively thick layer of gold on the chromium layer;

vacuum depositing a second chromium layer on the gold layer; selectively removing the second chromium layer in all areas except where a gold contact is ultimately desired on the surface of the semiconductor material;

forming narrow slots in the gold layer and underlying first chromium layer, thereby exposing that portion of the surface of the semiconductor material;

subjecting the exposed area of the surface to an etching fluid directed through the slots, thereby forming cavities in the semiconductor material;

concurrently with the forming of said cavities periodically bending the edges of the mask left overhanging the cavities along the sides of the undercut area, partially protecting the sidewalls from contact by the etching fluid, and thereby forming deep narrow grooves extending through the slice of semiconductor material, separating the slice into a plurality of individual detector elements;

subjecting the slice to a selective etchant for the gold except where protected by the chromium of the second chromium layer but not through the substrate;

subjecting the slice to a selective etchant for the chromium to remove the second chromium layer which is not protected by the gold, the remaining gold and underlying chromium forming electrical contacts for the respective detector elements;

patterning a metal film bonded to a thin flexible high temperature plastic sheet to form a plurality of conductors extending to enlarged solder pads, thereby formimg a circuit sheet suitable for use in a photodetector; and electrically connecting the contact on each detector element to a designated conductor on the circuit sheet.

22. The process defined in claim 21 wherein the photosensitive semiconductor material is comprised of mercury-doped germanium and the semiconductor substrate is comprised of degenerate germanium.